US010201012B2

(12) United States Patent
Kim et al.

(10) Patent No.: US 10,201,012 B2
(45) Date of Patent: Feb. 5, 2019

(54) RETRANSMISSION METHOD AT TIME OF SHARING TRANSMISSION OPPORTUNITY IN WIRELESS LAN SYSTEM, AND DEVICE THEREFOR

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR); Giwon Park, Seoul (KR); Suhwook Kim, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 147 days.

(21) Appl. No.: 15/302,470

(22) PCT Filed: Apr. 9, 2015

(86) PCT No.: PCT/KR2015/003566
§ 371 (c)(1),
(2) Date: Oct. 6, 2016

(87) PCT Pub. No.: WO2015/156616
PCT Pub. Date: Oct. 15, 2015

(65) Prior Publication Data
US 2017/0026947 A1 Jan. 26, 2017

Related U.S. Application Data

(60) Provisional application No. 61/977,640, filed on Apr. 10, 2014.

(51) Int. Cl.
*H04W 74/08* (2009.01)
*H04W 76/38* (2018.01)
(Continued)

(52) U.S. Cl.
CPC .......... *H04W 74/08* (2013.01); *H04B 7/0452* (2013.01); *H04L 5/0007* (2013.01);
(Continued)

(58) Field of Classification Search
CPC ... H04W 72/042; H04W 76/38; H04W 84/12; H04W 28/04; H04W 74/08; H04L 5/0007; H04B 7/0452
See application file for complete search history.

(56) References Cited

U.S. PATENT DOCUMENTS 9,854,607 B1 * 12/2017 Chu ................... H04W 52/241
2011/0103352 A1  5/2011 Wentink
(Continued)

FOREIGN PATENT DOCUMENTS

JP   2013539640    10/2013
WO   2014027847    2/2014

OTHER PUBLICATIONS

European Patent Office Application Serial No. 15776703.9, Search Report dated Nov. 23, 2017, 13 pages.
(Continued)

*Primary Examiner* — Hashim S Bhatti
(74) *Attorney, Agent, or Firm* — Lee, Hong, Degerman, Kang & Waimey (57) ABSTRACT

The present document relates to a wireless communication system and, more particularly, to a method for performing retransmission in a wireless LAN system to which transmission opportunity (TXOP) sharing is applied, and a device therefor. To this end, a station transmits an initial transmission frame including primary access category (AC) information and secondary access category (AC) information; and when there is no response to the secondary AC information of the initial transmission frame, reconfigures a back-off timer value for the secondary AC information and
(Continued)

retransmits the secondary AC information according to the reconfigured back-off timer value.

12 Claims, 7 Drawing Sheets

(51) Int. Cl.
 H04W 28/04 (2009.01)
 H04W 84/12 (2009.01)
 H04B 7/0452 (2017.01)
 H04L 5/00 (2006.01)
 H04W 72/04 (2009.01)

(52) U.S. Cl.
 CPC ......... *H04W 28/04* (2013.01); *H04W 72/042* (2013.01); *H04W 76/38* (2018.02); *H04W 84/12* (2013.01)

(56) References Cited

U.S. PATENT DOCUMENTS

| | | | | |
|---|---|---|---|---|
| 2012/0008490 | A1* | 1/2012 | Zhu | H04W 74/0841 370/216 |
| 2012/0051342 | A1* | 3/2012 | Liu | H04W 72/10 370/338 |
| 2012/0127969 | A1* | 5/2012 | He | H04W 74/085 370/336 |
| 2012/0140615 | A1 | 6/2012 | Gong | |
| 2012/0218947 | A1* | 8/2012 | Merlin | H04L 25/03343 370/329 |
| 2012/0314694 | A1* | 12/2012 | Hsieh | H04W 74/085 370/338 |
| 2013/0156005 | A1 | 6/2013 | Li et al. | |
| 2014/0050156 | A1* | 2/2014 | Chan | H04W 76/15 370/329 |
| 2014/0079046 | A1 | 3/2014 | Yang et al. | |
| 2016/0381565 | A1* | 12/2016 | Oteri | H04W 16/14 370/328 |

OTHER PUBLICATIONS

Gong, M. et al., "Error Recovery for TXOP Sharing", doc.: IEEE 802.11-11/0082r0, XP068035479, Jan. 2011, 6 pages.
Zhu, C. et al., "MAC Enhancements for Downlink Multi-User MIMO Transmission in Next Generation WLAN", XP032161038, Jan. 2012, 13 pages.
Zhu, C. et al., "TXOP Enhancement for DL MU-MIMO Support", doc.: IEEE 802.11-10/0591r0, XP017676922, May 2010, 14 pages.
Zhu, C. et al., "Multi-User Support in Next Generation Wireless LAN", IEEE Consumer Communications and Networking Conference, XP031865860, Jan. 2011, 13 pages.
Chu, L., "9.19.2.5 Comment Resolutions", doc.: IEEE 802.11-11/0933r0, Jul. 2011, 8 pages.
PCT International Application No. PCT/KR2015/003566, Written Opinion of the International Searching Authority dated Jul. 21, 2015, 22 pages.

* cited by examiner

RETRANSMISSION METHOD AT TIME OF SHARING TRANSMISSION OPPORTUNITY IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2015/003566, filed on Apr. 9, 2015, which claims the benefit of U.S. Provisional Application No. 61/977,640, filed on Apr. 10, 2014, the contents of which are all hereby incorporated by reference herein in their entirety.

TECHNICAL FIELD

The following description relates to a wireless communication system, and, more particularly, to a method of performing retransmission in a wireless local area network (WLAN) system for providing transmission opportunity (TXOP) sharing and a device therefor.

BACKGROUND ART

While downlink frame transmission period as proposed hereinbelow may be used in various kinds of wireless communications, a WLAN system will be taken as an exemplary system to which the present invention is applicable.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

Since the above-described standards for the WLAN technology maximally use bandwidth of 160 MHz and support eight spatial streams, IEEE 802.11ax standardization is being discussed in addition to IEEE 802.11ac standard maximally supporting a rate of 1 Gbit/s.

DISCLOSURE

Technical Problem

The present invention provides a method of employing a transmission opportunity (TXOP) sharing scheme and efficiently performing retransmission during transmission opportunity sharing operation in order to improve performance of a wireless communication system and a device therefor.

Technical Solution

According to an aspect of the present invention, a method of performing retransmission during transmission opportunity (TXOP) sharing in a wireless local area network (WLAN) system includes transmitting an initial transmission frame including primary access category (AC) information and secondary AC information; resetting a backoff timer value for the secondary AC information when there is no response to the secondary AC information of the initial transmission frame; and retransmitting the secondary AC information according to the reset backoff timer value.

When there is no response to the primary AC information and secondary AC information of the initial transmission frame, a backoff timer value for the primary AC information and a backoff timer value for the secondary AC information may be reset.

The backoff timer value for the secondary AC information is set to be equal to or greater than a backoff value for the primary AC information. To this end, the backoff timer value for the secondary AC information may be set to a value obtained by adding any one of (a) a current backoff timer value for the secondary AC information, (b) an arbitrary integer selected in a range of 0 to the current backoff timer value for the secondary AC information or (c) an arbitrary integer selected in a range of 0 to a current contention window (CW) for the secondary AC information to the backoff timer value for the primary AC information.

A first retry counter for transmission of the primary AC information and a second retry counter for transmission of the secondary AC information may independently operate.

When a value of the second retry counter reaches a predetermined threshold, the secondary AC information may be no longer retransmitted in a secondary AC format.

A value of the secondary retry counter may increase by 1 when a value of the first retry counter increases by a predetermined integer multiple.

The initial transformation frame for transmitting the primary AC information and the secondary AC information may be transmitted in a state of including a PLCP protocol data unit (PPDU).

The primary AC information and the secondary AC information may be transmitted through a primary channel and a secondary channel in an orthogonal frequency-division multiple access (OFDMA) transmission scheme.

At this time, a first retry counter for the primary channel and a second retry counter for the secondary channel may independently operate.

A CCA level of the primary channel may be set to a value less than that of the secondary channel.

The primary AC information may be transmitted through (a) the primary channel or (b) the primary channel and the secondary channel, and the primary AC information may not be transmitted only through the secondary channel.

The primary AC information and the secondary AC information may be used for downlink multi-user (MU) multiple input multiple output (MIMO) transmission for transmitting information from a specific access point (AP) to a plurality of stations (STAs), without being limited thereto.

According to another aspect of the present invention, a station device operating in a wireless local area network (WLAN) system includes a transceiver configured to transmit an initial transmission frame including primary access category (AC) information and secondary AC information in a specific transmission opportunity (TXOP) and a processor connected to the transceiver and configured to reset a backoff timer value for the secondary AC information when there is no response to the secondary AC information of the initial transmission frame and to enable the transceiver to retransmit the secondary AC information according to the reset backoff timer value.

The station device may operate as an access point (AP) or a station connected to a specific AP and may be configured to perform the above-described method.

Advantageous Effects

According to the present invention, it is possible to prevent inefficiency due to transmission failure and frequent group ID resetting as secondary access category (AC) is transmitted earlier than primary AC upon performing retransmission in a TXOP sharing mode.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method of performing retransmission in a wireless local area network (WLAN) system for providing transmission opportunity (TXOP) sharing and a device therefor. To this end, first, a WLAN system, to which the present invention is applied, will be described in detail.

Figure 1:
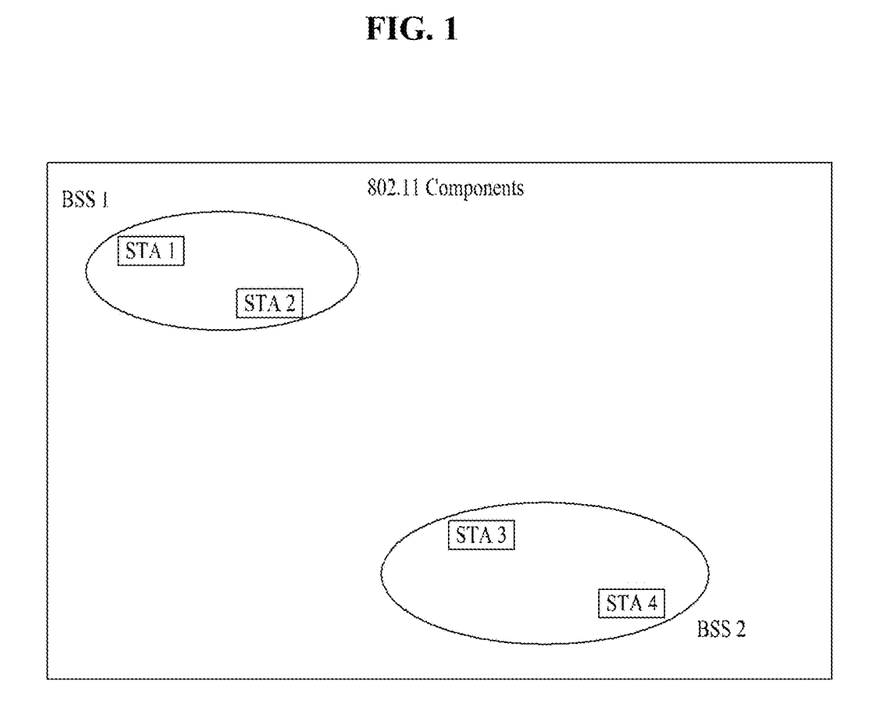
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
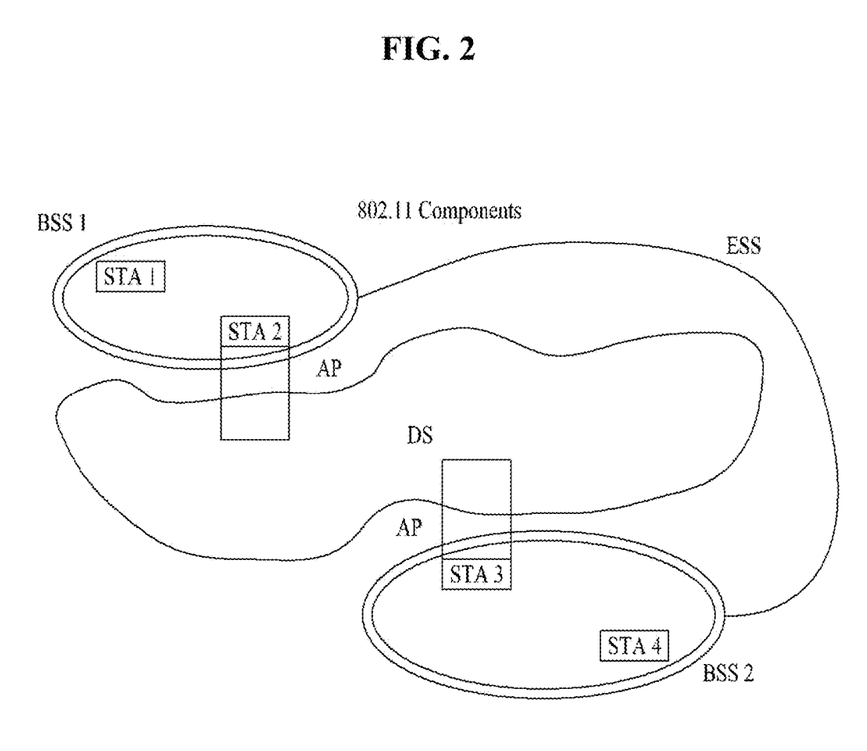
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

A backoff procedure and collision detection technology in a WLAN system will be described based on the above description.

In a wireless environment, since various factors influence a channel, a transmitter may not accurately perform collision detection. Therefore, in 802.11, a distributed coordination function (DCF) which is a carrier sense multiple access/collision avoidance (CSMA/CA) mechanism was employed.

Figure 3:
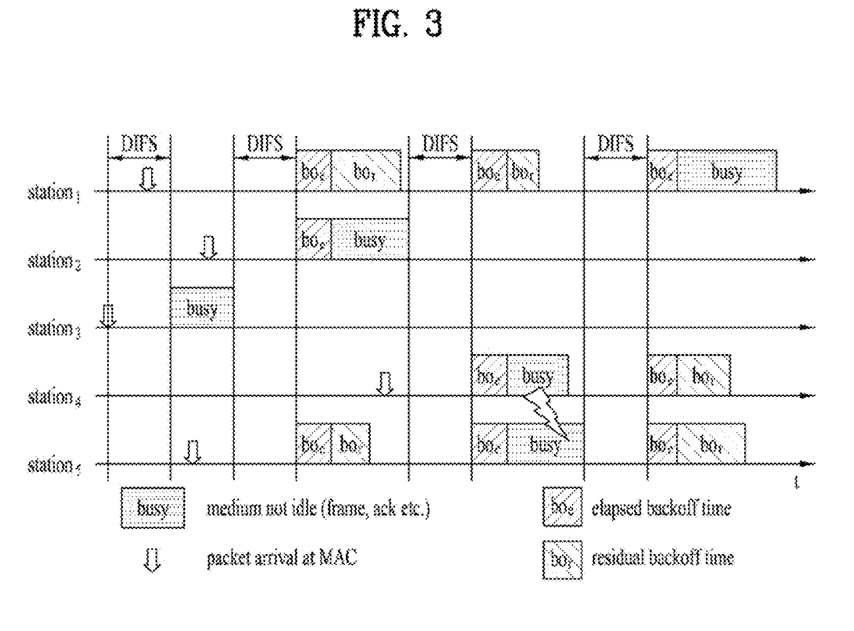
FIG. 3 is a diagram illustrating a Distributed Coordinated Function (DCF) mechanism in a WLAN system.

FIG. 3 is a diagram illustrating a backoff procedure and a DCF mechanism in a WLAN system.

The DCF performs clear channel assessment (CCA) for sensing a medium during a specific period (e.g., DCF inter-frame space (DIFS)) before STAs having data to be transmitted transmit the data. At this time, if the medium is idle, an STA may transmit a signal using the medium. However, if the medium is busy, on the assumption that several STAs are already waiting to use the medium, the STA may transmit data after further waiting for a random backoff period in addition to the DIFS. At this time, the random backoff period enables collision avoidance. When it is assumed that there are several STAs for transmitting data, the STAs stochastically have different backoff interval values and thus have different transmission times. When one STA starts to transmit data, the other STAs cannot use the medium.

The random backoff time and procedure will now be described in brief.

When a specific medium is changed from "busy" to "idle", several STAs start to prepare to transmit data. At this time, in order to minimize collision, the STAs, which will transmit data, select random backoff counts and wait for the slot times. The random backoff count is a pseudo-random integer value and one of uniformly distributed values in a range of [0 CW] is selected. CW means "contention window".

A CW parameter has a CWmin value as an initial value and the value thereof doubles when transmission fails. For example, when ACK is not received in response to the transmitted data frame, collision may be considered as occurring. When a CW value is a CWmax value, the CWmax value is maintained until data transmission succeeds. When data transmission succeeds, the CW value is reset to the CWmin value. At this time, CW, CWmin and CWmax preferably maintain $2^n-1$ for convenience of implementation and operation.

When the random backoff procedure starts, the STA selects a random backoff count in the range of [0 CW] and then continuously monitors the medium while a backoff slot is counted down. When the medium is changed to the busy state, countdown is stopped and, when the medium is changed to the idle state again, the countdown of the remaining backoff slot is resumed.

Referring to FIG. 3, when several STAs have data to be transmitted, STA3 immediately transmits a data frame because the medium is idle during the DIFS, and the remaining STAs wait until the medium changes to the idle state. Since the medium is busy for a long time, several STAs may wait for an opportunity to use the medium. Therefore, each STA selects a random backoff count. In FIG. 3, STA2, which has selected a smallest backoff count, transmits a data frame.

After transmission of STA2 is finished, the medium is changed to the idle state again and the STAs resume countdown of the backoff slot. In FIG. 3, STA5, which has the second smallest random backoff count after STA2 and has paused countdown when the medium is busy, finishes countdown of the remaining backoff slot and starts to transmit a data frame, but collision occurs because the random backoff count of STA5 is equal to the random backoff count of STA4. At this time, since the two STAs do not receive ACK after data transmission, the CW doubles and the random backoff count is reselected.

Figure 4:
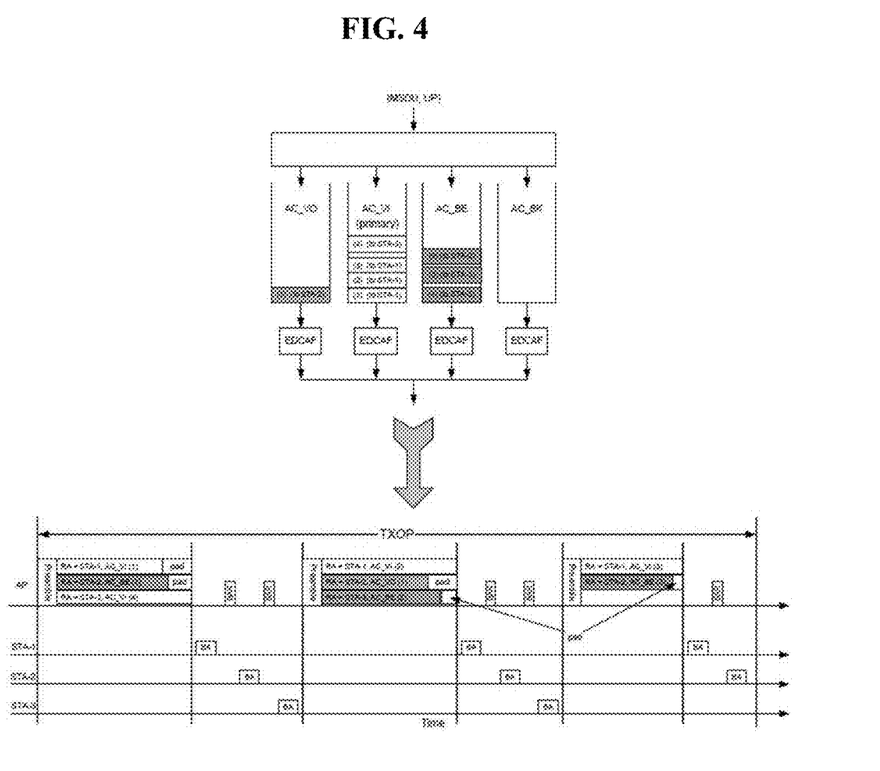
FIG. 4 is a diagram illustrating the concept of transmission opportunity (TXOP) sharing applied to an aspect of the present invention.

FIG. 4 is a diagram illustrating the concept of TXOP sharing according to an aspect of the present invention.

In IEEE 802.11ac standard, An AP may use this transmission mode in order to support DL-MU-MIMO. In the present invention, the below-described TXOP mode is applicable not only to MU-MIMO operation of an AP but also to data transmission of an STA.

In this mode, an access category (AC) connected to an EDCF which has acquired an EDCA TXOP may become a primary AC. TXOP sharing is applicable when resources allow traffic to be additionally included from a secondary AC when primary AC traffic is transmitted via an MU PPDU, and may support up to 4 STAs.

Addition of secondary AC traffic does not increase a time interval to above a time interval required for primary AC traffic transmission. If destinations of frames of queues of a primary AC and one or more secondary ACs are set, the frame of the primary AC queue may be first transmitted to the destination among a series of downlink transmissions in the TXOP. The secondary ACs, destinations and transmission order selected for TXOP sharing are implementation issues. Upon sharing, TXOP limit of the primary AC is applied to a TXOP interval.

In the example of FIG. 4, four ACs including AC-VO, AC_VI, AC-BE and AC_BK are defined, AC_VI is a primary AC to acquire a TXOP and AC_VO and AC_BE are selected as secondary ACs. These frames are transmitted to STA1, STA2 and STA3, respectively. In the following description, for example, TXOP sharing will be described.

Figure 5:
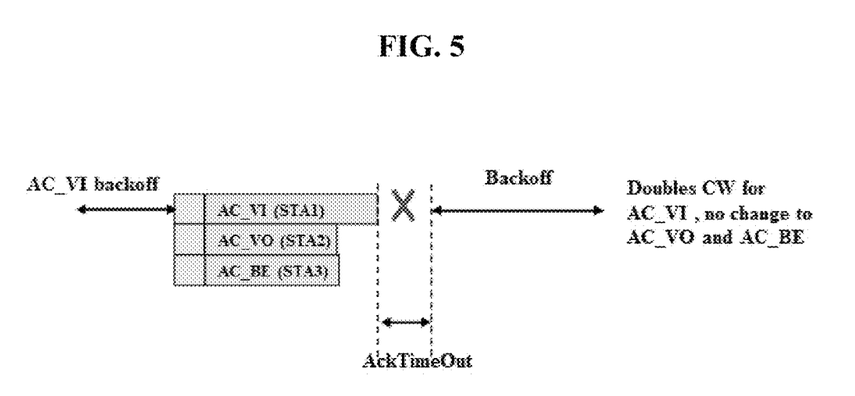
FIG. 5 is a diagram illustrating problems of retransmission operation in a TXOP sharing mode.

FIG. 5 is a diagram illustrating problems of retransmission operation in a TXOP sharing mode. More specifically, FIG. 5 illustrates problems of retransmission operation in the conventional IEEE 802.11ac standard.

MU MIMO TXOP sharing allows a plurality of secondary ACs to be piggybacked on a primary AC. A TXOP may be acquired using EDCA parameters of the primary AC. In FIG. 5, similarly to FIG. 4, assume that AC_VI is a primary AC and AC_VO and AC_BE are selected as secondary ACs.

In the conventional IEEE 802.11ac standard, when a valid response is not received in response to an initially transmitted frame in a TXOP, the AP starts an exponential backoff procedure with respect to the primary AC and resumes a backoff procedure without changing a CW with respect to the secondary ACs.

When the backoff procedure is performed with respect to the secondary ACs without changing the CW and/or without resetting a backoff timer value (backoff counter), secondary AC traffic may be transmitted earlier than primary AC traffic upon retransmission. This may cause continuous errors in secondary AC traffic transmission, thereby reducing system performance, particularly, in a high-density WLAN environment.

For example, in FIG. 5, assume that the values of the CW and backoff counter (BC) of each AC are as follows in initial transmission.

First step: AC_VI (CW=4, BC=0), AC_VO (CW=4, BC=2), AC_BE (CW=8, BC=4)

If initial transmission fails, in the conventional 11ac standard, the backoff procedure may be performed under the following settings.

Second step: AC_VI (CW=8, BC=6), AC_VO (CW=4, BC=2), AC_BE (CW=8, BC=4)

That is, in AC_VI which is the primary AC, the CW may increase from 4 of the first step to 8 of the second step and 6 which is an arbitrary value in a range of [0, 8] may be selected as BC. With respect to AC_VO and AC_BE which are secondary ACs, since the values of the CW and the BC are not reset, the BC values of the first step are included without change. Therefore, in retransmission, AC_VO may be transmitted earlier than AC_VI.

Such settings may be contrary to transmission for giving transmission priority to the primary AC and cause continuous transmission failure of the secondary ACs.

In addition, frequent change of the primary AC may increase a group ID change count, decreasing efficiency.

Table 1 shows a scheme for representing a membership status and a user position related to group ID management.

TABLE 1

| Category | 1 | Code 21 |
|---|---|---|
| VHT action | 1 | 0x01 |
| Membership status array | 8 | Membership status in group ID 0 (transmissions to AP): yes/no (1 bit) |
| | | . . . |
| | | Membership status in group ID 63(downlink SU transmissions) |
| User position array | 16 | User position in group ID 0: 0/1/2/3 |
| | | . . . User position in group ID 63 |

In a WLAN system, a plurality of group IDs may be allocated to an STA. In addition, with respect to each group ID, an AP may allocate the same user position to a plurality of STAs. The STAs may have only one user position within each group to which a corresponding STA belongs. The group ID may be allocated according to membership status or user position.

Figure 6:
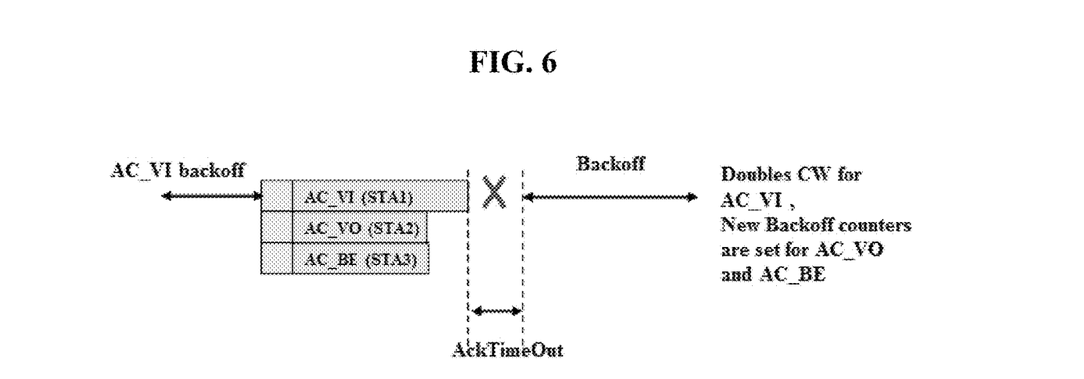
FIG. 6 is a diagram illustrating a method of performing retransmission in a TXOP sharing mode according to an embodiment of the present invention.

FIG. 6 is diagram illustrating a method of performing retransmission in a TXOP sharing mode according to an embodiment of the present invention.

In order to solve the above-described problems in association with FIG. 5, in a first embodiment of the present invention, if a valid response is not received in response to a secondary AC in a TXOP sharing mode, the backoff counter/timer (BC) of the secondary AC is reset through any one of the following methods.

(1) Option 1: An arbitrarily selected integer value is set as the BC on the assumption of uniform distribution in a range of [0, current CW value] (including a boundary)

(2) Option 2: An arbitrarily selected integer value is set as the BC on the assumption of uniform distribution in a range of [current BC value, current CW value](including a boundary)

(3) Option 3: An arbitrarily selected integer value is set as the BC on the assumption of uniform distribution in a range of [current BC value, double of the current CW value] (including a boundary)

(4) Option 4: An arbitrarily selected integer value is set as the BC on the assumption of uniform distribution in a range of [current BC value, current CW value+CWmin] (including a boundary), that is, the CW is set to current CW+CWmin.

(5) Option 5: An arbitrarily selected integer value is set as the BC on assumption of uniform distribution in a range of [0, current CW value+CWmin] (including a boundary), that is, the CW is set to current CW+CWmin.

(6) Option 6: An arbitrarily selected integer value is set as the BC on assumption of uniform distribution in a range of [current CW value, current CW value+CWmin] (including a boundary), that is, the CW is set to current CW+CWmin.

In the case of Option 1, since the reset value has a range from 0, the BC value of the secondary AC may be stochastically reset to a value smaller than the BC value of the primary AC. If the BC is reset within the above range with any probability, a probability wherein transmission errors continuously occur can be reduced. Options 2 and 3 are advantageous in that a BC value greater than the current BC value may be set.

In a second embodiment of the present invention, the BC of the secondary AC is not independently set but is reset depending on the BC value of the primary AC. For example, the BC value of the secondary AC may be set through any one of the following options.

(1) Option 1: backoff timer value of the primary AC+backoff timer value of the current secondary AC (2) Option 2: backoff timer value of the primary AC+arbitrary integer selected from a range of [0, backoff timer value of the current secondary AC]

(3) Option 3: backoff timer value of the primary AC+arbitrary integer selected from a range of [0, CW of the current secondary AC]

(4) Option 4: backoff timer value of the primary AC+arbitrary integer selected from a range of [0, CW+CWmin of the current secondary AC]

(5) Option 5: backoff timer value of the primary AC+arbitrary integer selected from a range of [0, doubles of the CW value of the current secondary AC]

(6) Option 6: backoff timer value of the primary AC+arbitrary integer selected from a range of [current BC, CW of the current secondary AC]

(7) Option 7: backoff timer value of the primary AC+arbitrary integer selected from a range of [current BC, CW+CWmin of the current secondary AC]

(8) Option 8: backoff timer value of the primary AC+arbitrary integer selected from a range of [current BC, double of the CW value of the current secondary AC]

(9) Option 9: backoff timer value of the primary AC+arbitrary integer selected from a range of [current CW, CW+CWmin of the current secondary AC]

(10) Option 10: backoff timer value of the primary AC+arbitrary integer selected from a range of [current CW, double of the CW value of the current secondary AC]

In a third embodiment of the present invention, if the BC value of the current secondary AC is greater than a newly set BC value of the primary BC, the BC is not reset and, when the BC value of the current secondary AC is less than the newly set BC value of the primary BC, the BC value of the secondary AC is reset according to the first embodiment or the second embodiment.

According to the above-described embodiments of the present invention, it is possible to minimize the number of groups allocated to one UE, to increase use efficiency of a restricted number (e.g., maximally 63) of group IDs, and to restrict an unnecessary group ID change count.

Another aspect of the present invention is to solve problems caused when a retry counter commonly operates in the primary AC and the secondary AC in the above-described TXOP sharing mode.

If the retry counter increases through TXOP sharing whenever secondary AC traffic is retransmitted, only the secondary AC may be transmitted without trying transmission of the primary AC and then traffic transmission may finish, according to situations. More specifically, in the conventional TXOP sharing mode described with reference to FIG. 5, if the BC of AC_VO or AC BE is not reset and thus is transmitted earlier than AC_VI, AC_VI which is the primary AC may not be retransmitted due to continuous retransmission failure of AC_VO/AC BE.

Accordingly, in one embodiment of the present invention, a retry counter for the primary AC and a retry counter for the secondary AC are independently managed.

More specifically, after the retry counter for the secondary AC is defined, whenever retransmission of the secondary AC is performed, the counter increases by 1. If the counter reaches a specific threshold (e.g., 2 or 4), the AP may no longer try transmission of traffic corresponding to the secondary AC in a secondary AC format. That is, if the retry counter for the secondary AC is equal to or greater than the specific threshold, retransmission of the secondary AC may be paused in order to try retransmission of the primary AC.

As another example, if the retry counter increases by 1 whenever retransmission of the primary AC is performed, the retry counter for the PDU may increase by a predetermined scaling value when the secondary AC is retransmitted. For example, if retransmission of the secondary AC is performed twice (or three times), the retry counter may increase by 1.

Hereinafter, applying a retransmission method to an OFDMA scheme in the above-described TXOP sharing mode will be described. The above-described retransmission method defined for DL MU-MIMO is similarly applicable to OFDMA.

An access point (AP) may use OFDMA in a primary channel and one or more secondary channels. The CCA level value of the primary channel may be less than that of the secondary channel. Assume that the EDCA backoff mechanism/protocol is applied to only the primary channel.

The AP according to an embodiment of the present invention may define a retry counter for the secondary channel and then increase the counter by 1 whenever retransmission is performed through the secondary channel. If the counter reaches a specific threshold (e.g., 2 or 4), the AP may no longer try retransmission of traffic of the STA through the secondary channel.

As another embodiment, if the retry counter increases by 1 whenever retransmission is performed through the primary channel, the retry counter for the PDU may increase by a predetermined scaling value when retransmission is performed through the secondary channel. For example, if retransmission is performed twice (or three times) through the secondary channel, the retry counter for the secondary channel may increase by 1.

A mapping relationship between the channel and the AC when the above-described TXOP sharing method is applied to the OFDMA scheme will now be described.

The AP may use OFDMA in one primary channel and one or more (e.g., three) secondary channels. In addition, the CCA level value of the primary channel may be less than that of the secondary channel.

Using some concepts of 11ac TXOP sharing, the primary AC and the secondary AC may be selected using the same method as TXOP sharing. At this time, as the number of STAs for transmitting data through the secondary AC, a value greater than the number of secondary channels may not be selected. For example, when the number of secondary channels is 3, the maximum number of STAs for transmitting data through the secondary AC is 3.

As described above, the selected primary/secondary AC traffics may be transmitted through the primary/secondary channels using OFDMA. At this time, the primary AC traffic may be transmitted through the primary channel or the primary channel and the secondary channel. That is, the primary AC traffic may not be transmitted only through the secondary channel.

Since the CCA level value of the primary channel is less than that of the secondary channel, a channel having relatively excellent clearness may be preferentially selected and used for transmission and, at the same time, at least the primary channel is always used for transmission. Therefore, the traffic of the primary AC may be allocated to such a channel.

Figure 7:
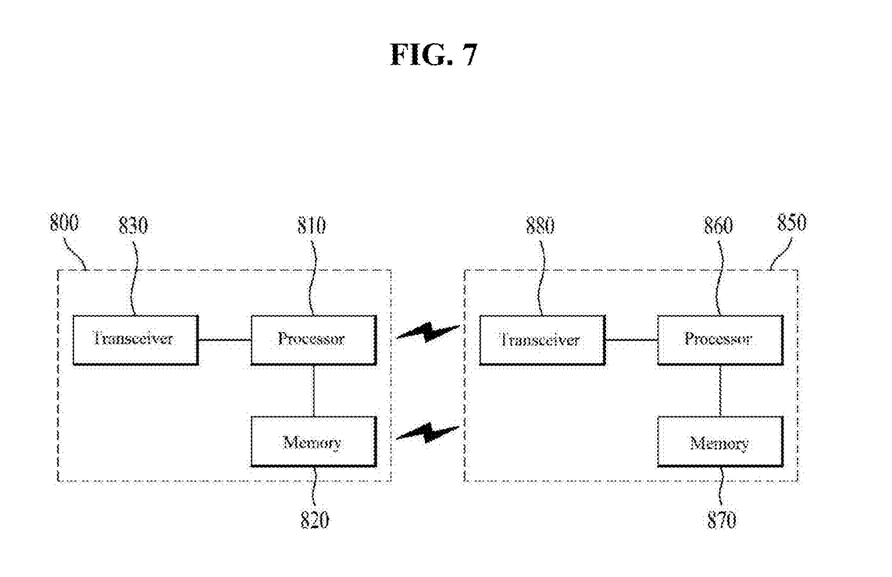
FIG. 7 is a diagram illustrating a device for implementing a wireless local area network (WLAN) operation method using a downlink frame transmission period.

FIG. 7 is a diagram illustrating a device for implementing a retransmission method in the above-described TXOP sharing mode.

A wireless device 800 of FIG. 7 may correspond to a specific STA of the above description and a wireless device 850 may correspond to the AP of the above description.

The STA may include a processor 810, a memory 820 and a transceiver 830 and the AP 850 may include a processor 860, a memory 870 and a transceiver 880. The transceivers 830 and 880 may transmit and receive a radio signal and may be executed at a physical layer of IEEE 802.11/3GPP. The processors 810 and 860 may be executed at the physical layer and/or MAC layer and are connected to the transceivers 830 and 880. The processors 810 and 860 may perform the above-described interference control procedure.

The processors 810 and 860 and/or the transceivers 830 and 880 may include application-specific integrated circuits (ASICs), other chipsets, logic circuits and/or data processors. The memories 820 and 870 may include read-only memories (ROMs), random access memories (RAMs), flash memories, memory cards, storage media and/or other storage units. When one embodiment is implemented as software, the above-described method may be embodied as a module (e.g., process, function) for performing the above-described function. The module may be stored in the memories 820 and 870 and may be executed by the processors 810 and 860. The memories 820 and 870 may be disposed inside or outside the processors 810 and 860 and may be connected to the processors 810 and 860 by a well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although it is assumed that the present invention is applied to an IEEE 802.11 based wireless local area network (WLAN) system, the present invention is not limited thereto. The present invention is applicable to various wireless systems which employ TXOP sharing between wireless devices.

What is claimed is:

1. A method of performing retransmission during transmission opportunity (TXOP) sharing in a wireless local area network (WLAN) system, the method comprising:
   transmitting an initial transmission frame including primary access category (AC) information and secondary AC information;
   resetting a backoff timer value for the secondary AC information when there is no response to the secondary AC information of the initial transmission frame; and
   retransmitting the secondary AC information according to the reset backoff timer value,
   wherein a first retry counter for transmission of the primary AC information and a second retry counter for transmission of the secondary AC information independently operate.

2. The method according to claim 1, wherein the backoff timer value for the secondary AC information is set to be equal to or greater than a backoff value for the primary AC information.

3. The method according to claim 1, wherein the backoff timer value for the secondary AC information is set to a value obtained by adding any one of (a) a current backoff timer value for the secondary AC information, (b) an arbitrary integer selected in a range of 0 to the current backoff timer value for the secondary AC information or (c) an arbitrary integer selected in a range of 0 to a current contention window (CW) for the secondary AC information to a backoff timer value for the primary AC information.

4. The method according to claim 1, wherein, when a value of the second retry counter reaches a predetermined threshold, the secondary AC information is no longer retransmitted in a secondary AC format.

5. The method according to claim 1, wherein a value of the second retry counter increases by 1 when a value of the first retry counter increases by a predetermined integer multiple.

6. The method according to claim 1, wherein the initial transformation frame for transmitting the primary AC information and the secondary AC information is transmitted in a state of including a PLCP protocol data unit (PPDU).

7. The method according to claim 1, wherein the primary AC information and the secondary AC information are transmitted through a primary channel and a secondary channel in an orthogonal frequency-division multiple access (OFDMA) transmission scheme.

8. The method according to claim 7, wherein a clear channel assessment (CCA) level of the primary channel is set to a value less than that of the secondary channel.

9. The method according to claim 7, wherein:
the primary AC information is transmitted through (a) the primary channel or (b) the primary channel and the secondary channel, and
the primary AC information is not transmitted only through the secondary channel.

10. The method according to claim 1, wherein the primary AC information and the secondary AC information are used for downlink multi-user (MU) multiple input multiple output (MIMO) transmission for transmitting information from a specific access point (AP) to a plurality of stations (STAs).

11. A station device operating in a wireless local area network (WLAN) system, the station device comprising:
a transceiver configured to transmit an initial transmission frame including primary access category (AC) information and secondary AC information in a specific transmission opportunity (TXOP);
a processor connected to the transceiver and configured to reset a backoff timer value for the secondary AC information when there is no response to the secondary AC information of the initial transmission frame and to enable the transceiver to retransmit the secondary AC information according to the reset backoff timer value; and
a memory for independently storing a first retry counter for transmission of the primary AC information and a second retry counter for transmission of the secondary information.

12. The station device according to claim 11, wherein the station device operates as an access point (AP) or a station connected to a specific AP.

* * * * *